United States Patent [19]

Matsunaga et al.

[11] Patent Number: 5,109,293
[45] Date of Patent: Apr. 28, 1992

[54] METHOD OF MANUFACTURING FERROELECTRIC LIQUID CRYSTAL DISPLAY ELEMENT

[75] Inventors: Masaaki Matsunaga, Sayama; Hiroshi Maruyama, Tokorozawa, both of Japan

[73] Assignee: Citizen Watch Co., Ltd., Tokyo, Japan

[21] Appl. No.: 485,400

[22] Filed: Feb. 26, 1990

[30] Foreign Application Priority Data

Feb. 28, 1989 [JP] Japan .................................. 1-45378

[51] Int. Cl.⁵ .............................................. G02F 1/133
[52] U.S. Cl. .................................... 359/76; 359/62
[58] Field of Search ........................... 350/341, 340

[56] References Cited

U.S. PATENT DOCUMENTS

| | | | |
|---|---|---|---|
| 4,820,025 | 4/1989 | Nakanowatari | 350/334 |
| 4,832,462 | 5/1989 | Clark et al. | 350/341 |
| 4,844,597 | 7/1989 | Katagiri et al. | 350/350 S |
| 4,882,085 | 11/1989 | Toshinaga et al. | 350/350 S |

FOREIGN PATENT DOCUMENTS

| | | | |
|---|---|---|---|
| 0126954 | 11/1978 | Japan | 350/341 |
| 0161213 | 12/1980 | Japan | 350/341 |
| 0192926 | 11/1982 | Japan | 350/341 |
| 192724 | 8/1987 | Japan . | |

OTHER PUBLICATIONS

Peter J. Collins, *Liquid Crystals*, Princeton University Press, Princeton, N.J. (1990), pp. 112–117.
Hiroshima et al, "Effect of Surface Topography of Aligning Layers on Temperature Dependence of Liquid Crystal Pretilt Angle", Japan Display '86, pp. 316–319.

*Primary Examiner*—Stanley D. Miller
*Assistant Examiner*—Anita Pellman Gross
*Attorney, Agent, or Firm*—Townsend and Townsend

[57] ABSTRACT

Disclosed in a ferroelectric liquid crystal display element in which oblique alignment layers are inclined with respect to a substrate surface and have opposite inclination directions which are formed on opposing surfaces of a pair of substrates having transparent electrodes. A ferroelectric liquid crystal is sandwiched between the substrates. The liquid crystal is injected into the space between the substrates only in a direction opposite to the inclination direction of the oblique alignment layers.

4 Claims, 2 Drawing Sheets

METHOD OF MANUFACTURING FERROELECTRIC LIQUID CRYSTAL DISPLAY ELEMENT

BACKGROUND OF THE INVENTION

The present invention relates to a method of manufacturing a liquid crystal display element and, more particularly, to a liquid crystal injection method for a ferroelectric liquid crystal display element.

It is expected that ferroelectric liquid crystal display elements are put into practical applications such as a large-capacity display or a high-speed liquid crystal shutter for a printer since it has a memory property and a high-speed response property on the order of microsecond. When ferroelectric liquid crystal display elements are put into practical applications, they pose a technical problem of an alignment property of a liquid crystal.

The aligning methods for a ferroelectric liquid crystal which are presently used can be largely classified into a method of rubbing an organic thin film, and a method of obliquely vapor-depositing an inorganic material such as a metal oxide. In the aligning method utilizing a rubbing treatment, since a large number of linear alignment defects caused by a difference in layer structure appear in a rubbing axis direction and a direction almost perpendicular to the axis direction, a contrast ratio of black and white levels is considerably decreased, and it is hard to impart a memory property as the major characteristic feature of the ferroelectric liquid crystal to an aligned liquid crystal.

In contrast to this, with the method utilizing oblique vapor deposition, an aligning film which includes little alignment defects can be obtained. When an opposite gradient alignment structure is employed wherein SiO oblique vapor deposition films having opposite inclination directions are formed on opposing surfaces of a pair of substrates, as described in a method disclosed in Japanese Pat. Laid-Open No. 62-192742, a liquid crystal display element having a memory property and a high contrast ratio can be obtained.

However, a ferroelectric liquid crystal display element using SiO oblique vapor deposition alignment films formed by opposite gradient alignment suffers from local misalignment when a liquid crystal display element becomes large in size (e.g., a 10×10 (cm) display element, a 25 (cm)×1 (cm) elongated liquid crystal shutter element, and the like). As a result, uniform alignment cannot be attained.

SUMMARY OF THE INVENTION

It is therefore an object of the present invention to improve a uniform alignment property of a liquid crystal display element and to provide a practical method of manufacturing a large ferroelectric liquid crystal display element.

According to the present invention, in a ferroelectric liquid crystal display element in which oblique alignment layers which are inclined with respect to a substrate surface and have opposite inclination directions are formed on opposing surfaces of a pair of substrates having transparent electrodes, and a ferroelectric liquid crystal is sandwiched between the substrates, the liquid crystal is injected from a direction opposite to the inclination directions of the oblique alignment layers.

According to the method of the present invention, a liquid crystal is injected in a direction opposite to an inclination direction of small columns forming the alignment layers, so that liquid crystal molecules can reach bottom ends of the columns to define an aligning direction, thus achieving very good alignment.

DETAILED DESCRIPTION OF THE PREFERRED EMBODIMENT

Figure 1:
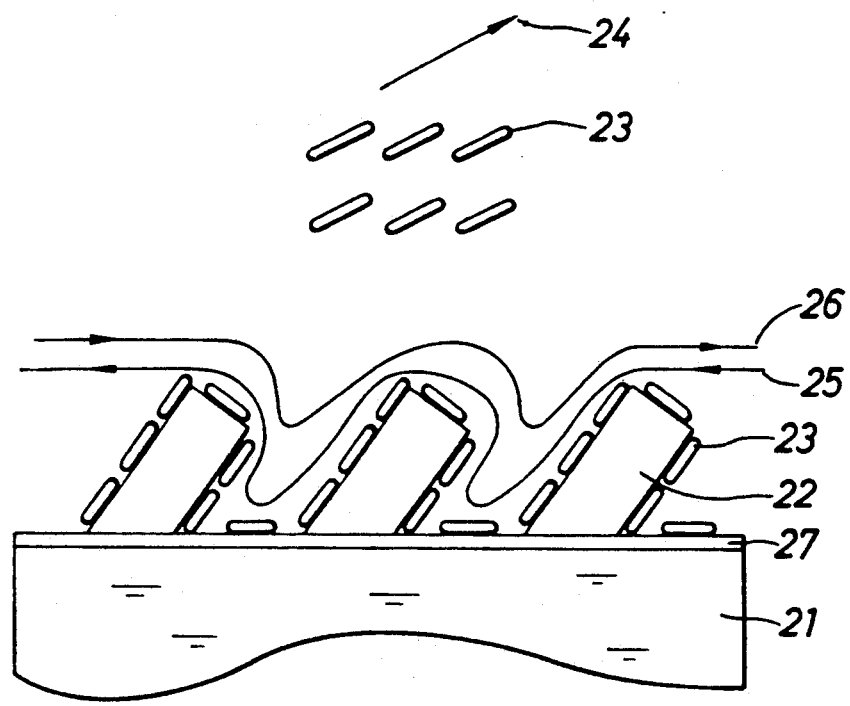
FIG. 1 is a sectional view showing the relationship between small SiO columns and an aligning direction of liquid crystal molecules.

An effect of the present invention will be described in detail below with reference to the accompanying drawings. In FIG. 1, an aligning direction 24 of liquid crystal molecules is determined by small SiO columns 22 formed on a glass substrate 21 with a transparent electrode 27. It is considered that the aligning direction is approximate to an average of directions of all liquid crystal molecules 23 attached to the small SiO columns 22 (Japan Display, '86, p. 316). Therefore, when the degree of attachment of the liquid crystal molecules to the small SiO columns 22 changes, an aligning property and a pretilt angle of liquid crystal molecules with respect to a glass interface also vary. When a liquid crystal is injected from a direction 26 along an inclination direction of the small SiO columns 22 attached to the glass substrate 21, as shown in FIG. 2, it is difficult for the liquid crystal molecules to reach bottom ends of the small SiO columns 22. Thus, the aligning direction of the liquid crystal molecules cannot be sufficiently defined, thus easily causing misalignment. In contrast to this, it is estimated that when a liquid crystal is injected in a direction 25 opposite to the inclination direction of the SiO columns, the liquid crystal molecules can reach the bottom ends of the small SiO columns, and a stable aligning direction can be defined.

An embodiment of the present invention will be described below with reference to FIGS. 2A and 2B.

Figure 2A:
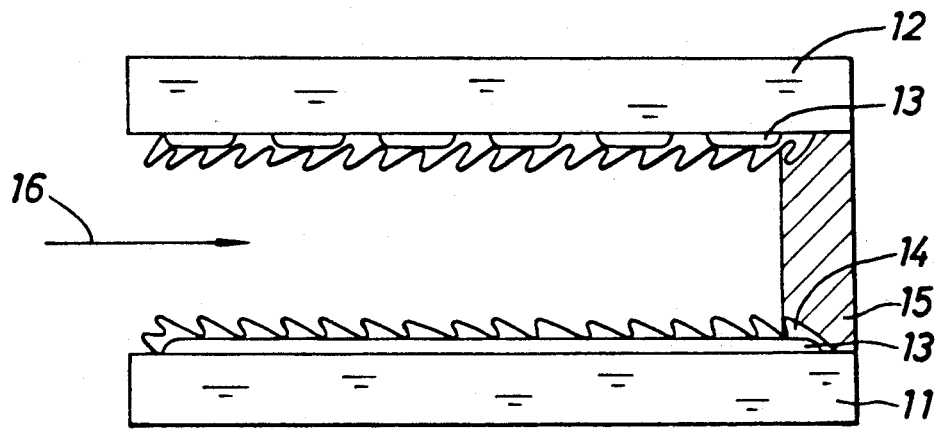
FIG. 2A is a sectional view showing a liquid crystal display element to which small SiO columns become attached and which represents a liquid crystal injection direction according to the present invention.
Figure 2B:
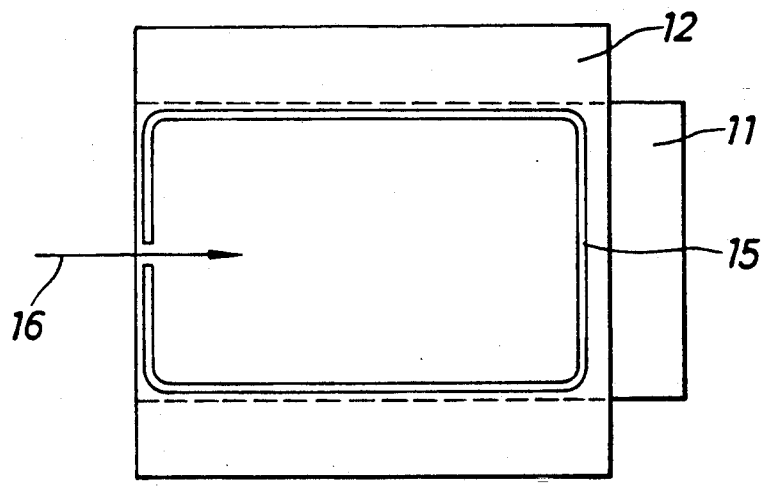
FIG. 2B is a plan view of the liquid crystal display element.

FIG. 2A is a sectional view of a liquid crystal display element according to an embodiment of the present invention. A liquid crystal display element is constituted by two, i.e., upper and lower glass substrates 11 and 12 which have 1,000-Å thick transparent electrodes 13 and to which 800-Å thick small SiO columns 14 are attached, and an epoxy resin seal 15. A gap of 2.5μ is defined between the two substrates. A ferroelectric liquid crystal CS-1014 (available from Chisso Corp.) is injected in a direction 16 as a direction opposite to the inclination direction of the small SiO columns 14, thereby forming a liquid crystal display element. FIG. 2B is a plan view of the liquid crystal display element. An effective display area in the epoxy resin seal 15 is 100 cm².

One hundred liquid crystal display elements were prepared by the above-mentioned injection method and their alignment yield was examined. As a result, a high good product alignment yield of 95% which could not be obtained by other injection methods could be obtained.

Figure 3:
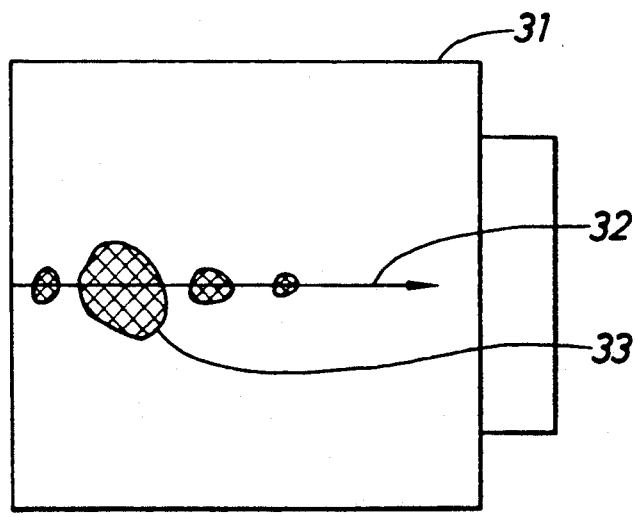
FIG. 3 is a plan view of a liquid crystal display element showing a misalignment region.

The good product alignment yield of liquid crystal display elements which were prepared such that only the direction of the epoxy resin seal of the liquid crystal display element used in the above embodiment was reversed through 180°, and a liquid crystal was injected in a direction along the inclination direction of the SiO columns was about 60%. As shown in FIG. 3, misalignment regions 33 were formed along a liquid crystal injection path 32 including an injection port.

Figure 4:
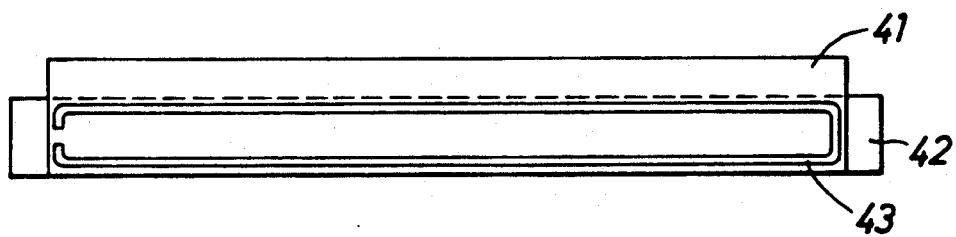
FIG. 4 is a plan view of a liquid crystal cell for a printer head.

FIG. 4 is a plan view of a liquid crystal cell for a printer head according to another embodiment of the present invention. FIG. 4 shows a liquid crystal cell for a printer head, which is constituted by a 16 (mm)×239 (mm) upper glass substrate 41, a 6 (mm)×249 (mm) lower glass substrate 42, and an epoxy resin seal 43, and a gap of 2.5μ is defined between the glass substrates. Transparent conductive films and small SiO columns are attached to the substrates.

A ferroelectric liquid crystal CS-1014 (available from Chisso Corp.) was injected in a direction opposite to the inclination direction of the SiO columns into 200 liquid crystal cells and their good product alignment yield was examined. As a result, a yield of 80% was obtained. Note that the good product alignment yield of liquid crystal cells to which a liquid crystal was injected in other injection directions was 60% or less.

In the embodiments as above described, small columns consist of SiO. However, other materials such as $Al_2O_3$ and $MgF_2$ may be used for the small columns.

As described above, according to the present invention, when a ferroelectric liquid crystal is injected in a direction opposite to the inclination direction of small columns, a liquid crystal alignment state can be free from misalignment over a wide region. As a result, the alignment yield can be remarkably improved as compared to liquid crystal injection in other directions, and practical ferroelectric liquid crystal display elements can be provided.

What we claim is:

1. A method of manufacturing a ferroelectric liquid crystal display element comprising a pair of substrates each having transparent electrodes thereon, and ferroelectric liquid crystal sandwiched between said substrates; each of said substrates having an oblique alignment layer on an inside opposing surface thereof, said layers being inclined with respect to a substrate surface and having opposite inclination directions characterized in that said liquid crystal is injected into the space between said two substrates only in a direction opposite to the inclination direction of the oblique alignment layers.

2. A method according to claim 1, wherein said oblique alignment layers are columns of micro-structure.

3. A method according to claim 2, wherein said columns consist of one of substances SiO, $Al_2O_3$ and $MgF_2$.

4. A method for reducing misalignment regions of large area ferroelectric liquid crystal displays comprising:

providing an upper and a lower substrate disposed so as to form a gap between said substrates;

sealing said gap with an epoxy seal;

providing transparent electrodes on the inner surface of each of said substrates, said electrodes having a thickness of approximately 1,000Å;

providing an alignment layer on the inner surface of each said substrate; said alignment layer having a plurality of oblique columns; said columns having a thickness of approximately 800Å;

injecting a ferroelectric liquid crystal material through said seal only in a direction that is substantially opposite to the direction of incline of said oblique columns whereby a stable and substantially uniform aligning direction is defined.

* * * * *